Patented Oct. 24, 1922.

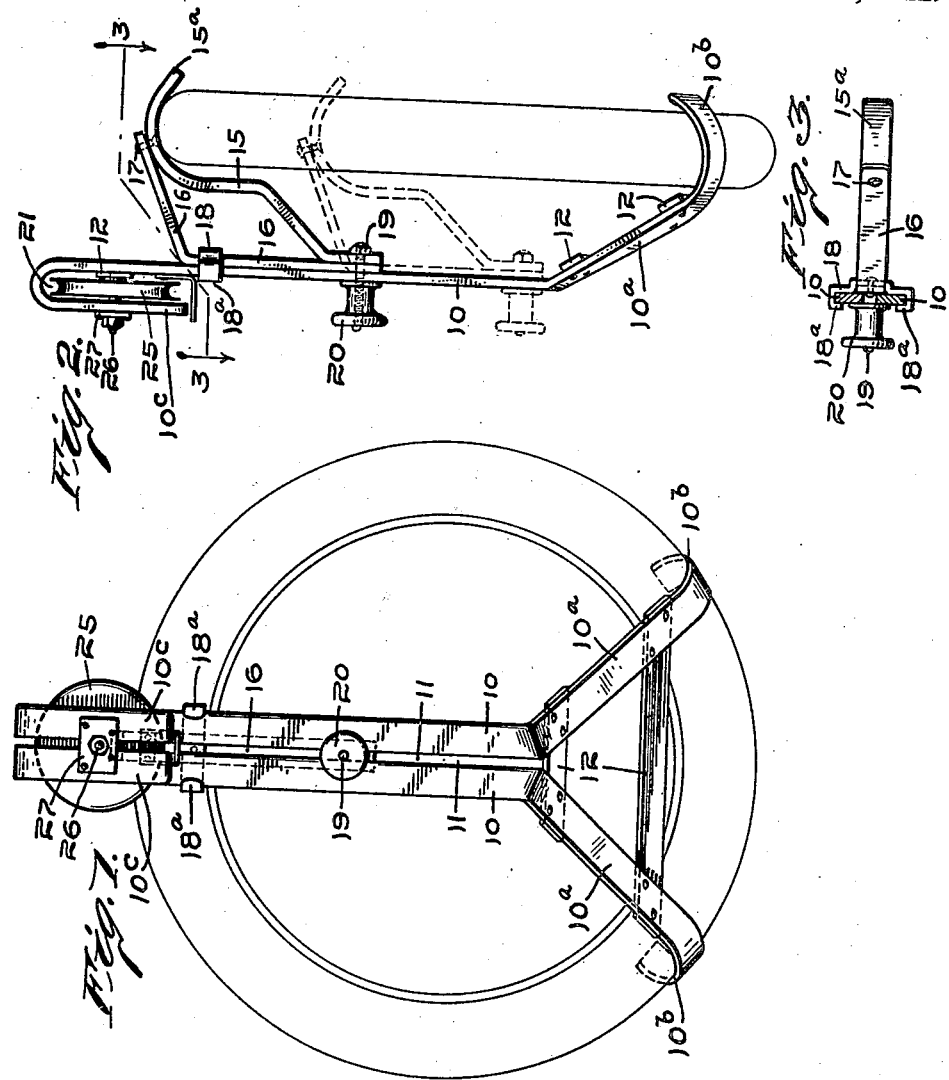

1,433,019

UNITED STATES PATENT OFFICE.

LOUIS J. McMILLIN, OF INDIANAPOLIS, INDIANA.

WHEEL CLAMP FOR DUMPING VEHICLES.

Application filed July 3, 1921. Serial No. 483,627.

*To all whom it may concern:*

Be it known that I, LOUIS J. MCMILLIN, a citizen of the United States, residing at Indianapolis, in the county of Marion and State of Indiana, have invented certain new and useful Improvements in Wheel Clamps for Dumping Vehicles, of which the following is a specification.

This invention relates to a device for clamping and securing the wheels on that end of a vehicle which is to be elevated to effect a discharge of the transported load, being particularly applicable for use in connection with that class of vehicle hoists which forms the subject-matter of my pending application, Serial No. 474,805, filed June 3, 1921; and the principal object of the present invention consists in the provision of a wheel clamp of the above character which is simple in construction, easy to attach and detach, and which may be adjusted to accommodate and clamp wheels of different diameters.

A further object of the invention consists in the provision of a wheel clamp of the above character in which the structural arrangement admits of its ready attachment to and detachment from the hoisting cable.

I accomplish the above objects of the invention, and such others as may appear from a perusal of the following description and claims, by means of the construction illustrated in the accompanying drawings, forming a part hereof, in which—

Figure 1 is a front elevation of my improved wheel clamp. Fig. 2 is a side elevation of the construction shown in Fig. 1. Fig. 3 is a transverse sectional view on the plane 3—3 in Fig. 2.

Referring to the drawings, the wheel clamp contemplates a frame which comprises a vertical body which, as shown in the drawings, is preferably formed of two parallel members 10 so spaced as to provide a narrow intervening slot 11, the purposes of which will be hereinafter described. I prefer to form the body of the device of two members instead of a single member in order to simplify manufacture, for the reason that the lower end terminates in diverging arms 10ª to provide a contact at points located a uniform distance from a vertical plane through the axis of the wheel, and these arms are thus more easily formed. The members 10 are held in spaced relation by means of the transverse cleats 12 properly riveted to both of said members. The lower and diverging free ends of members 10 terminate in upwardly disposed hooks 10ᵇ which extend partly about and support the wheel. In order to clamp the upper portion of the tire I provide a bar 15 which terminates at its upper end into a hook 15ª adapted to reach over and partly embrace the periphery of the wheel. The opposite end of the bar 15 contacts a brace-bar 16 which rests against the adjacent surface of the body members 10, and the upper end of bar 16 inclines outwardly so as to contact, support and brace the hook 15ª through its rigid attachment with said hook by means of the rivet 17. Brace-bar 16 is provided with a transverse cleat 18 the ends of which terminate in hooks 18ª, and these hooks extend about and embrace the side edges of the body members 10. This construction while preventing lateral displacement of bar 16 from the body members 10 permits said bar and its associated bar 15 to be adjusted vertically along the body members 10 and thereby provide the necessary accommodation for clamping wheels of different diameters. The brace-bar 16 and its associated bar 15 may be rigidly clamped and held in any desired adjustment along body members 10 by means of a threaded bolt 19 which extends through the overlapped ends of the two bars 15 and 16 and projects through the slot 11 between the two body members 10. A hand-wheel 20 is susceptible of being screwed upon the threaded end of bolt 19 to bring the end of the hand-wheel into contact with the adjacent face of body members 10 and thus effectively clamp the latter and the bars 15 and 16 together. This construction and arrangement of parts not only provides a very effective clamp, but readily permits the distance between hook 15ª and hooks 10ᵇ at the bottom of the frame to be varied.

To enable my wheel-clamping device to be readily attached and detached from the hoisting-cable, not shown, I form the upper free ends of the body members 10 into a downwardly disposed hook 10ᶜ. The space 21 intervening the body members 10 and the hook 10ᶜ is adapted to receive a sheave-wheel 25 which is arranged on a suitable spindle or bolt 26 which passes through one of the cleats 12 on the body members 10 and a cleat 27 on the hook 10ᶜ. By means of this arrangement the hoisting-cable may be readily introduced and removed from the groove in the sheave-wheel 25 when desired. To prevent accidental displacement of the cable from the sheave-wheel when the cable is in a slack condition I provide a resilient spring 28 which is secured to the side wall of members 10 with the free end of the spring projecting across the mouth of the space intervening the body and hook 10$^b$. When it is desired to insert or remove the cable, this may readily be accomplished by bending the free end of the spring downwardly.

From the foregoing description it will be observed that I have provided a very simple and efficient device for the clamping of vehicle wheels when it is desired to elevate the vehicles to discharge their contents.

Having thus fully described my said invention, what I desire to secure by Letters Patent, is—

1. A wheel clamp of the character described comprising a body merging at its lower end in a pair of diverging branches with the free ends of the latter terminating into hooks to embrace the tire of the wheel, an adjustable bar terminating at its upper end in a hook to fit over the upper portion of the tire, means for clamping the bar at different points along the body, and means on the body to form an attachment with the hauling cable.

2. A wheel clamp of the character described comprising a body merging at its lower end in a pair of diverging branches with the free ends of the latter terminating into hooks to embrace the tire of the wheel, an adjustable bar terminating at its upper end in a hook to fit over the upper portion of the tire, means for clamping the bar at different points along the body, and a sheave-wheel carried by the body to form a detachable connection with the hauling cable.

3. A wheel clamp of the character described comprising a body merging at its lower end in a pair of diverging branches with the free ends of the latter terminating into hooks to embrace the tire of the wheel, an adjustable bar terminating at its upper end in a hook to fit over the upper portion of the tire, means for clamping the bar at different points along the body, a hook formed by bending the upper end of the body downwardly, and a sheave-wheel arranged between the latter hook and body to form a detachable connection with the hauling cable.

4. A wheel clamp of the character described comprising a body merging at its lower end in a pair of diverging branches with the free ends of the latter terminating into hooks to embrace the tire of the wheel, an adjustable bar terminating at its upper end in a hook to fit over the upper portion of the tire, means for preventing accidental separation of the bar and body, means for clamping the bar at different points along the body, a hook formed by bending the upper end of the body downwardly, and a sheave-wheel arranged between the latter hook and body to form a detachable connection with the hauling cable.

5. A wheel clamp of the character described comprising a body merging at its lower end in a pair of diverging branches with the free ends of the latter terminating into hooks to embrace the tire of the wheel, an adjustable bar terminating at its upper end in a hook to fit over the upper portions of the tire, means for clamping the bar at different points along the body, a hook formed by bending the upper end of the body downwardly, a sheave-wheel arranged between the latter hook and body to form a detachable connection with the hauling cable, and means for preventing accidental displacement of the hauling cable from the sheave-wheel.

6. A wheel clamp of the character described comprising a body composed of a pair of parallel members spaced apart to provide an intervening slot with the lower portions of the members bent to form diverging arms which terminate in hooks, a movable bar adjustably mounted on the body and terminating at one end in a hook adapted to embrace the upper portion of the tire, means consisting of a screw-bolt passing through the bar and through the slot in the body, a hand-wheel on said bolt for clamping the bar and body together, a sheave-wheel carried by the body and adapted to engage the hoisting-cable, and means for preventing accidental disarrangement of the cable from the sheave-wheel.

In witness whereof, I have hereunto set my hand and seal at Indianapolis, Indiana, this 6th day of July, A. D. one thousand nine hundred and twenty-one.

LOUIS J. McMILLIN. [L. S.]